United States Patent
Sah et al.

(10) Patent No.: US 7,324,885 B2
(45) Date of Patent: *Jan. 29, 2008

(54) SHIFT THROUGH NEUTRAL CONTROL IN AN ELECTRICALLY VARIABLE TRANSMISSION

(75) Inventors: Jy-Jen F. Sah, West Bloomfield, MI (US); Todd M Steinmetz, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 721 days.

This patent is subject to a terminal disclaimer.

(21) Appl. No.: 10/779,558

(22) Filed: Feb. 14, 2004

(65) Prior Publication Data

US 2005/0182543 A1   Aug. 18, 2005

(51) Int. Cl.
*B60W 10/02* (2006.01)
*B60W 10/10* (2006.01)
*G06F 17/00* (2006.01)

(52) U.S. Cl. .............................. 701/58; 701/51; 701/66; 477/34; 477/37; 477/83

(58) Field of Classification Search ................. 701/22, 701/51, 67, 65, 58, 66; 477/3, 8, 15, 34, 477/70, 174, 175, 176, 37, 107, 173, 110, 477/83, 77

See application file for complete search history.

(56) References Cited

U.S. PATENT DOCUMENTS

| | | | |
|---|---|---|---|
| 4,733,580 A | 3/1988 | Kubo et al. | |
| 5,165,308 A | 11/1992 | Asada et al. | |
| 5,711,409 A | 1/1998 | Murata | 192/87 |
| 5,833,570 A * | 11/1998 | Tabata et al. | 477/3 |
| 5,890,392 A | 4/1999 | Ludanek et al. | |
| 5,931,757 A * | 8/1999 | Schmidt | 475/2 |
| 5,982,045 A | 11/1999 | Tabata et al. | |
| 6,019,698 A * | 2/2000 | Lawrie et al. | 477/5 |
| 6,019,699 A * | 2/2000 | Hoshiya et al. | 477/20 |
| 6,090,005 A | 7/2000 | Schmidt et al. | |
| 6,122,583 A | 9/2000 | Kirchhoffer et al. | |
| 6,351,700 B1 * | 2/2002 | Muramoto et al. | 701/51 |
| 6,358,173 B1 | 3/2002 | Klemen et al. | |
| 6,393,928 B1 * | 5/2002 | Watanabe | 74/336 R |
| 6,491,599 B1 | 12/2002 | Schmidt | |
| 6,527,659 B1 | 3/2003 | Klement et al. | |
| 6,551,208 B1 | 4/2003 | Holmes et al. | |
| 6,575,872 B2 | 6/2003 | Gluck et al. | |
| 6,656,087 B1 | 12/2003 | Runde et al. | |

FOREIGN PATENT DOCUMENTS

CN   1207350 A   2/1999

* cited by examiner

*Primary Examiner*—Thomas Black
*Assistant Examiner*—Christine M Behncke

(57) ABSTRACT

A shift control for an electrically variable transmission shifts between modes through a neutral mode wherein the output is decoupled from the transmission. Normally, shifts between modes are accomplished synchronously through a duration of fixed-ratio operation. Extreme driving conditions may invoke shifts through neutral mode. Ratio violations characterized by one mode being active in a preferred input/output ratio range for another mode are handled by a shift through neutral. Similarly, rapid acceleration and deceleration conditions likely to result in undesirable engine speeds if synchronous shifting is employed are handled by a shift through neutral.

12 Claims, 13 Drawing Sheets

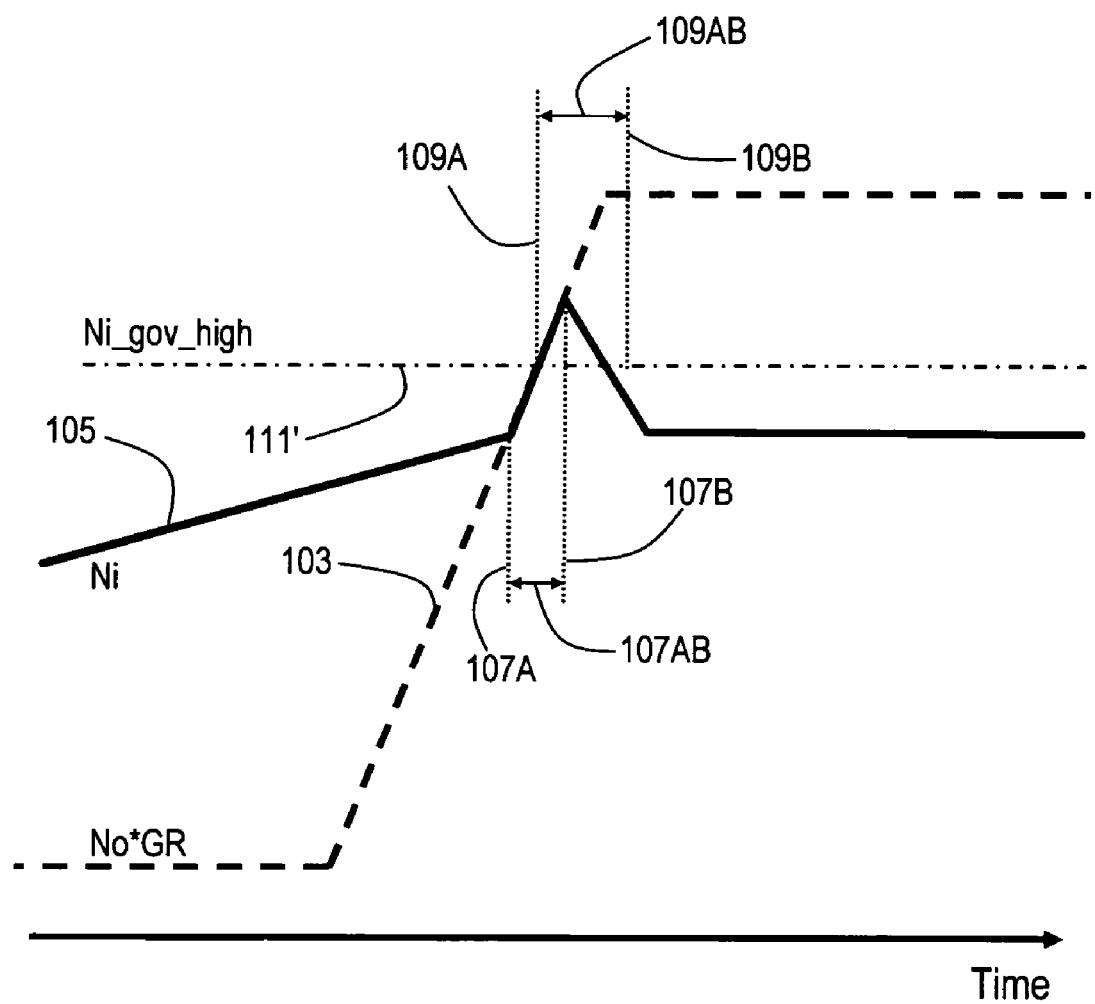

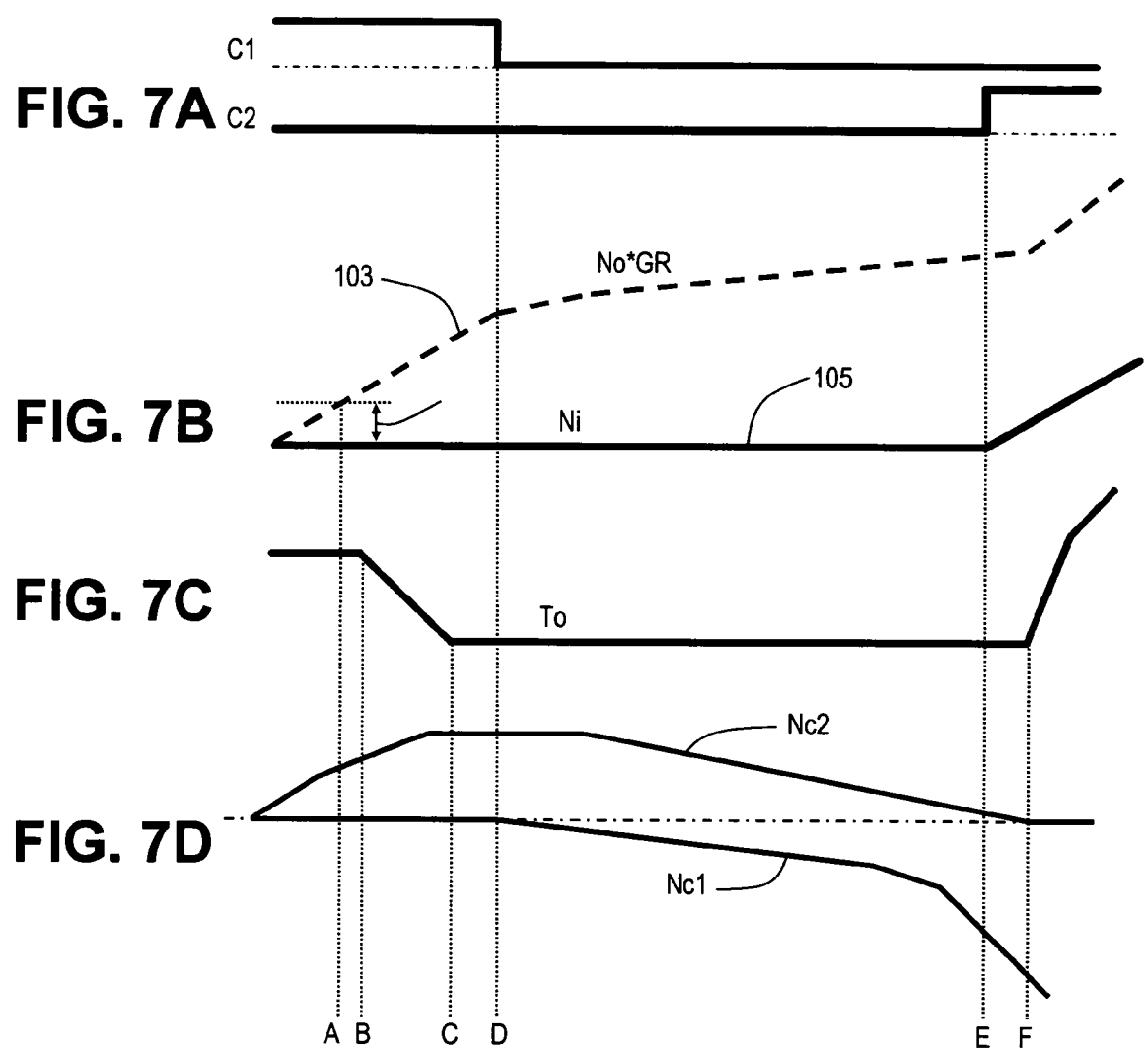

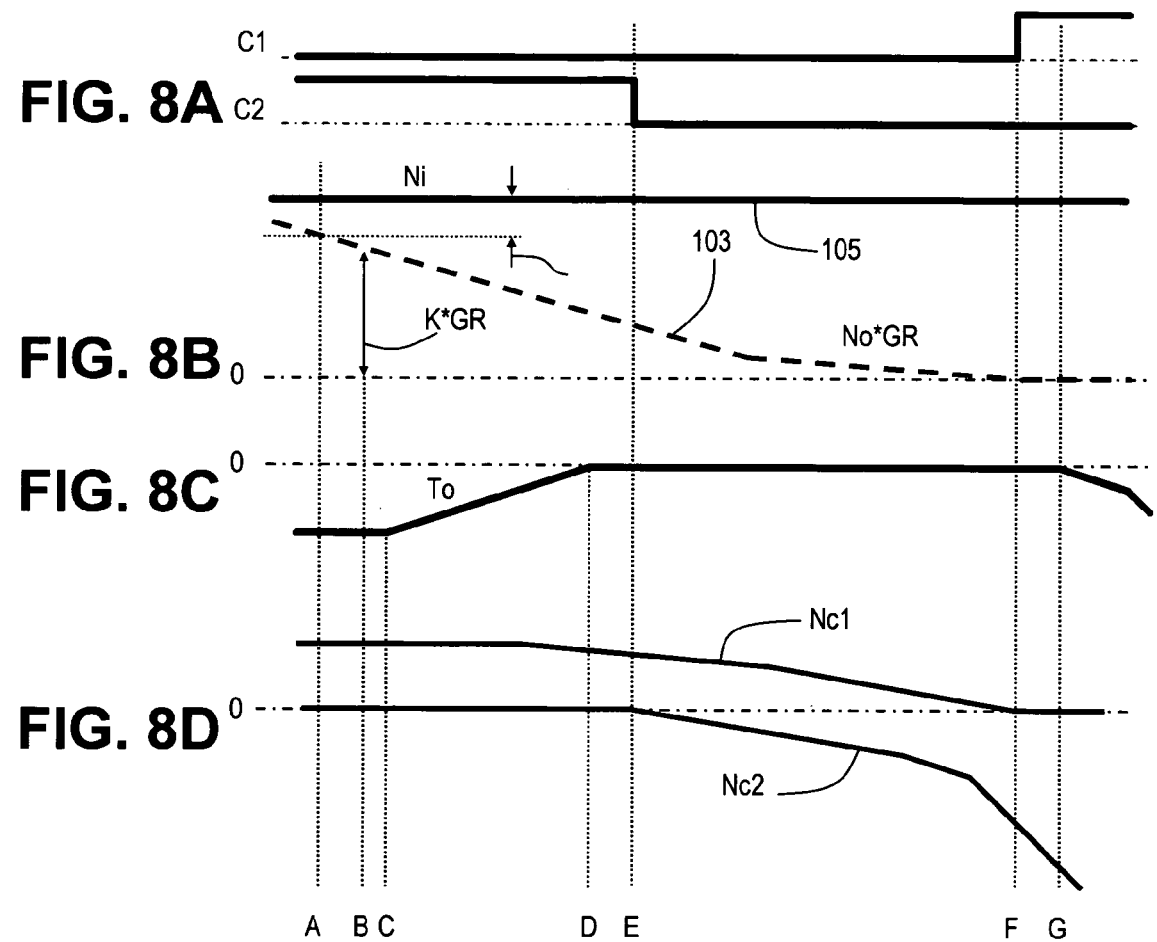

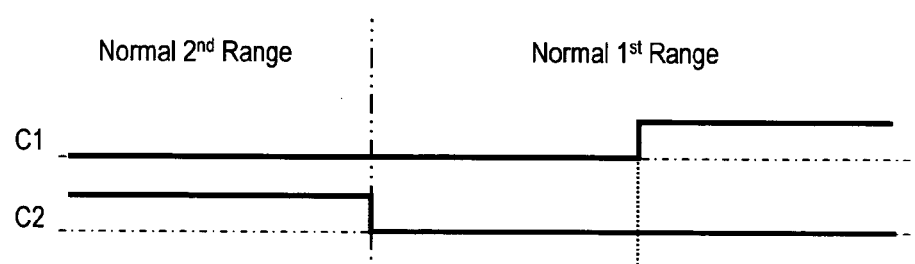
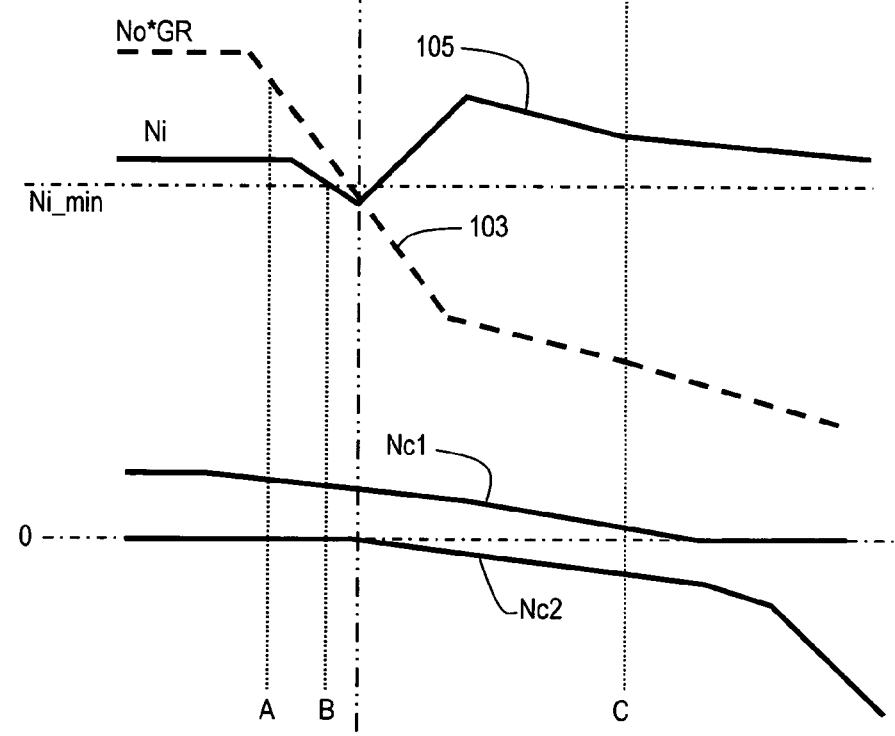

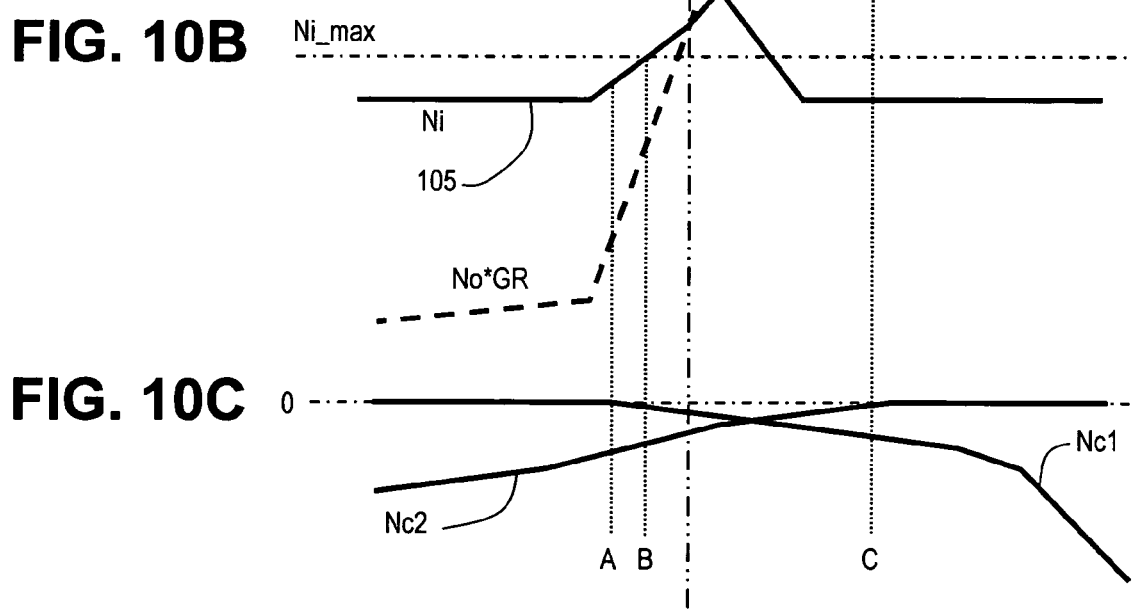

SHIFT THROUGH NEUTRAL CONTROL IN AN ELECTRICALLY VARIABLE TRANSMISSION

TECHNICAL FIELD

The present invention is related to control of a multi-mode hybrid transmission. More particularly, the invention is concerned with shifts of the transmission from one mode to another mode.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel hybrid powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque continuously variable speed ratios, electrically dominated launches, regenerative braking, engine off idling, and multi-mode operation.

Generally, it is desirable to perform ratio changes in a transmission such that torque disturbances are minimized and the shifts are smooth and unobjectionable. Additionally, it is generally desirable to perform releases and applications of clutches in a manner which dissipates the least amount of energy and does not negatively impact durability of the clutches. A major factor affecting these considerations is the torque at the clutch being controlled which may vary significantly in accordance with such performance demands as acceleration and vehicle loading. In certain EVTs, shift torque reductions can be accomplished by a zero or close to zero torque condition at the clutches at the time of application or release, which condition follows substantially zero slip thereacross.

EVTs are known in which range changes are controlled through a two-clutch synchronization and release process. Therein, a first clutch associated with a currently active range is carrying torque in an applied state and a second clutch associated with a currently inactive second range is carrying no torque in a released state. Shifting from the first range to the second range is accomplished by controlling the unapplied clutch to zero slip speed and the applying the clutch thereby placing the EVT in a two clutch application state. During the two-clutch application sate the engine is directly mechanically coupled to the output. The two clutch application state is exited and the second range effected by the release of the first clutch during control of the first clutch to zero slip speed. An exemplary such EVT and synchronous shift control is disclosed in co-pending and commonly assigned U.S. patent application Ser. No. 10/686,510.

While many vehicle operating situations avail themselves to smooth torque transfer between clutches through such synchronous shift controls, there are certain situations where system constraints may result in undesirable results. For example, very aggressive accelerations and decelerations may result in engine lugging or overspeed during the two-clutch application phase. Also, ratio violations may occur wherein the EVT is operating in one range at an input speed/output speed point preferred for the other range, which situation is desirably rectified.

SUMMARY OF THE INVENTION

Therefore, the present invention addresses these undesirable result by accomplishing mode shifts through a neutral mode under certain conditions. A shift through neutral shift may be invoked by an actual or anticipated engine speed violation during rapid acceleration or deceleration. Likewise a shift through neutral shift may be invoked by a ratio violation wherein a mode is operating in an input/output ratio region that is preferred for another mode.

Once entry conditions are satisfied for a shift through neutral, an output torque reduction may be performed. The dynamic nature of acceleration and deceleration violations may not provide adequate opportunity to reduce output torque. But the dynamic nature of ratio violations will generally allow for such a torque reduction to reduce objectionable driveline disturbances attendant to the shift. The torque transfer device that is applied for the present mode is released and a neutral mode is established. Motor torque is then used to reduce the slip across the torque transfer device required to establish the desired ratio. When the slip has been reduced to substantially zero, the corresponding torque transfer device is applied. Once fully applied, the output torque can be reestablished at a non-zero value in the case where a torque reduction had been performed in preparation for the shift through neutral.

BRIEF DESCRIPTION OF THE DRAWINGS

FIG. 6 is a graphical representation of a synchronous upshift during rapid vehicle acceleration resulting in undesirable engine lugging;

FIGS. 7A-7D are graphical representations of various powertrain parameters illustrative of a shift through neutral upshift precipitated by a speed ratio violation condition and accomplished in accordance with the present invention, wherein FIG. 7A illustrates clutch states,
FIG. 7B illustrates input and output speed quantities,
FIG. 7C illustrates output torque command, and
FIG. 7D illustrates clutch slip speeds;

FIGS. 8A-8D are graphical representations of various powertrain parameters illustrative of a shift through neutral downshift precipitated by a speed ratio violation condition and accomplished in accordance with the present invention, wherein FIG. 8A illustrates clutch states,
FIG. 8B illustrates input and output speed quantities,
FIG. 8C illustrates output torque command, and
FIG. 8D illustrates clutch slip speeds;

FIGS. 9A-9C are graphical representations of various powertrain parameters illustrative of a shift through neutral downshift precipitated by a rapid deceleration condition and accomplished in accordance with the present invention, wherein FIG. 9A illustrates clutch states,
FIG. 9B illustrates input and output speed quantities, and
FIG. 9C illustrates clutch slip speeds;

FIGS. 10A-10C are graphical representations of various powertrain parameters illustrative of a shift through neutral upshift precipitated by a rapid acceleration condition and accomplished in accordance with the present invention, wherein FIG. 10A illustrates clutch states,
FIG. 10B illustrates input and output speed quantities, and
FIG. 10C illustrates clutch slip speeds;

DESCRIPTION OF THE PREFERRED EMBODIMENT

Figure 1:
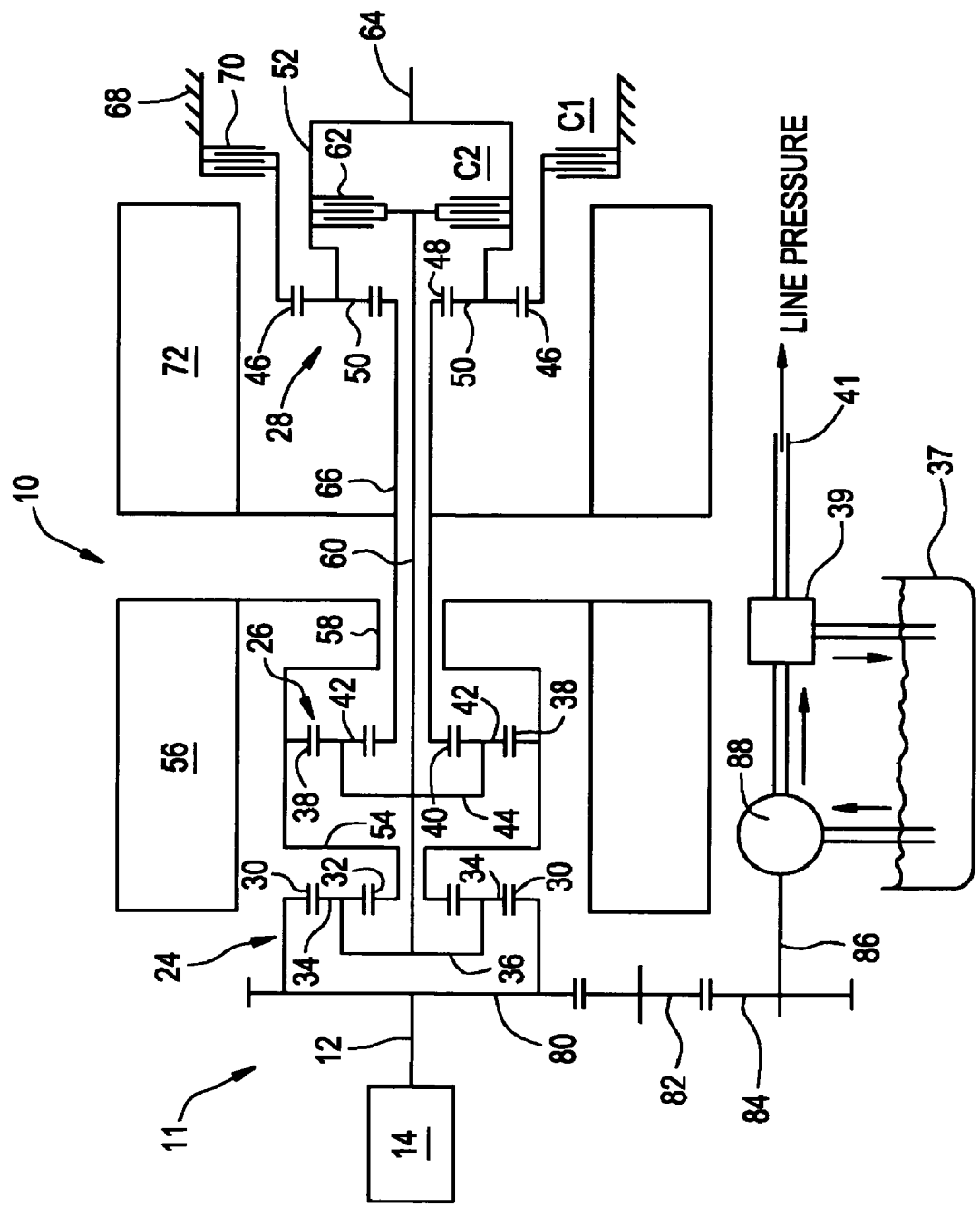
FIG. 1 is a mechanical hardware schematic representation of one preferred form of a two-mode, compound-split, electrically variable transmission particularly suited to the control of the present invention.
Figure 2:
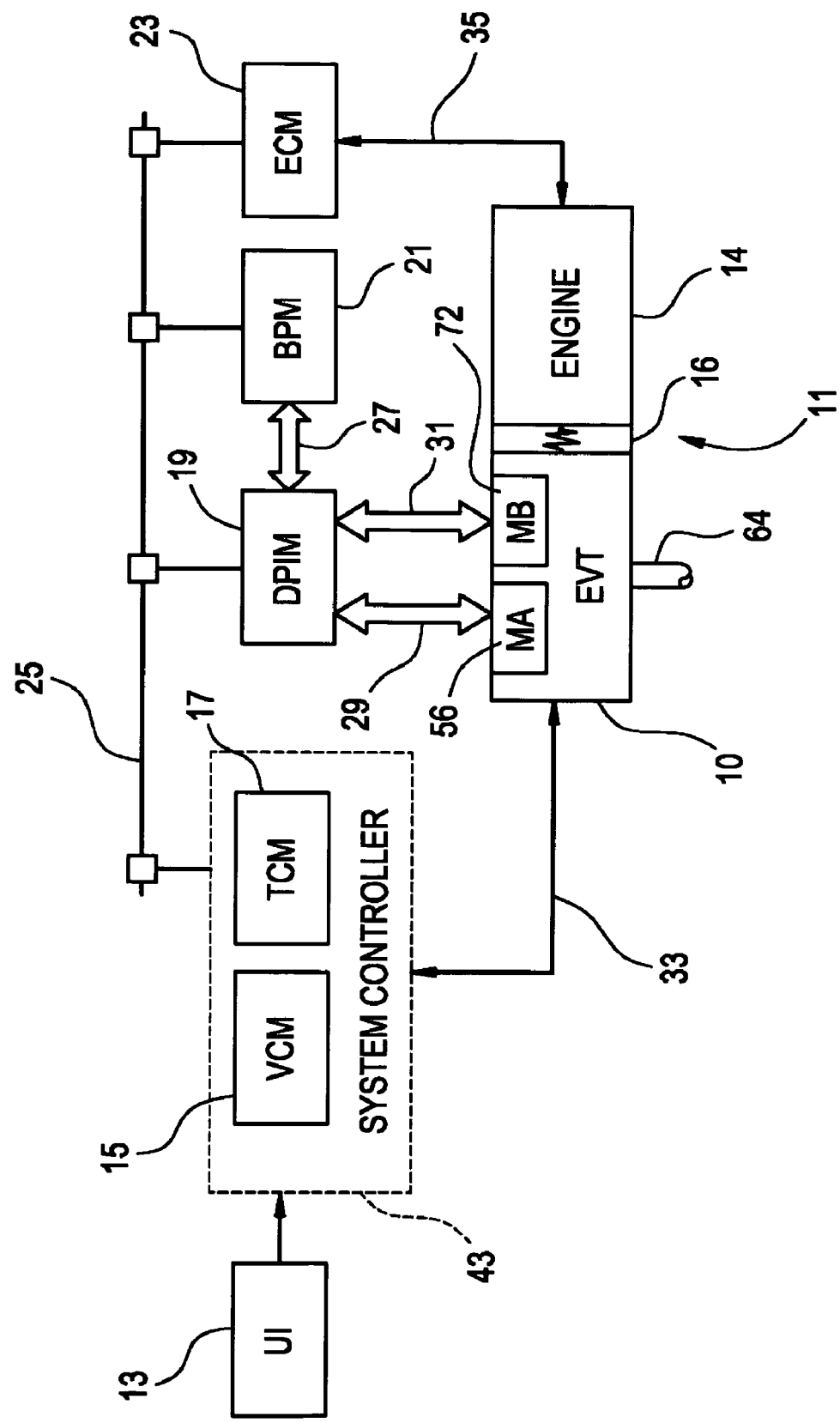
FIG. 2 is an electrical and mechanical schematic of a preferred system architecture for implementing the control of the present invention.

With reference first to FIGS. 1 and 2, a vehicular powertrain is generally designated 1. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those figures, the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or $M_A$.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or $M_B$. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e.: the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module (ECM) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engines electronics, controls and quantities are generally well known to those skilled in the art and further detailed exposition thereof is not required herein.

As should be apparent from the foregoing description the EVT 10 selectively receives power from the engine 14. As will now be explained with continued reference to FIG. 2 the EVT also receives power from an electric storage device such as one or more batteries in battery pack module (BPM) 21. Other electric storage devices that have the ability to store electric power and dispense electric power may be used in place of the batteries without altering the concepts of the present invention. The BPM 21 is high voltage DC coupled to dual power inverter module (DPIM) 19 via DC lines 27. Current is transferable to or from the BPM 21 in accordance with whether the BPM 21 is being charged or discharged. DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 31 and provides current to the DC lines 27. The net DC current provided to or from the inverters determines the charge or discharge operating mode of the BPM 21. Preferably, MA and MB are three-phase AC machines and the inverters comprise complementary three-phase power electronics. Individual motor speed signals Na and Nb for MA and MB, respectively, are also derived by the DPIM 19 from the motor phase information or conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, System controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Trim valves are preferably employed using variable bleed solenoids to provide precise placement of the spool within the valve body and correspondingly precise control of clutch pressure during apply. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, $M_A$ speed Na and $M_B$ speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others. System controller 43 determines a torque command Te_cmd and provides it to ECM 23. Torque command Te_cmd is representative of the EVT torque contribution desired from the engine as determined by the system controller.

The various modules described (i.e. system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example the preferred protocol for heavy duty applications is the Society of Automotive Engineers standard J1939. The CAN bus and appropriate protocols provide for robust messaging and multi-controller interfacing between the system controller, ECM, DPIM, BPM and other controllers such as antilock brake and traction controllers.

Figure 3:
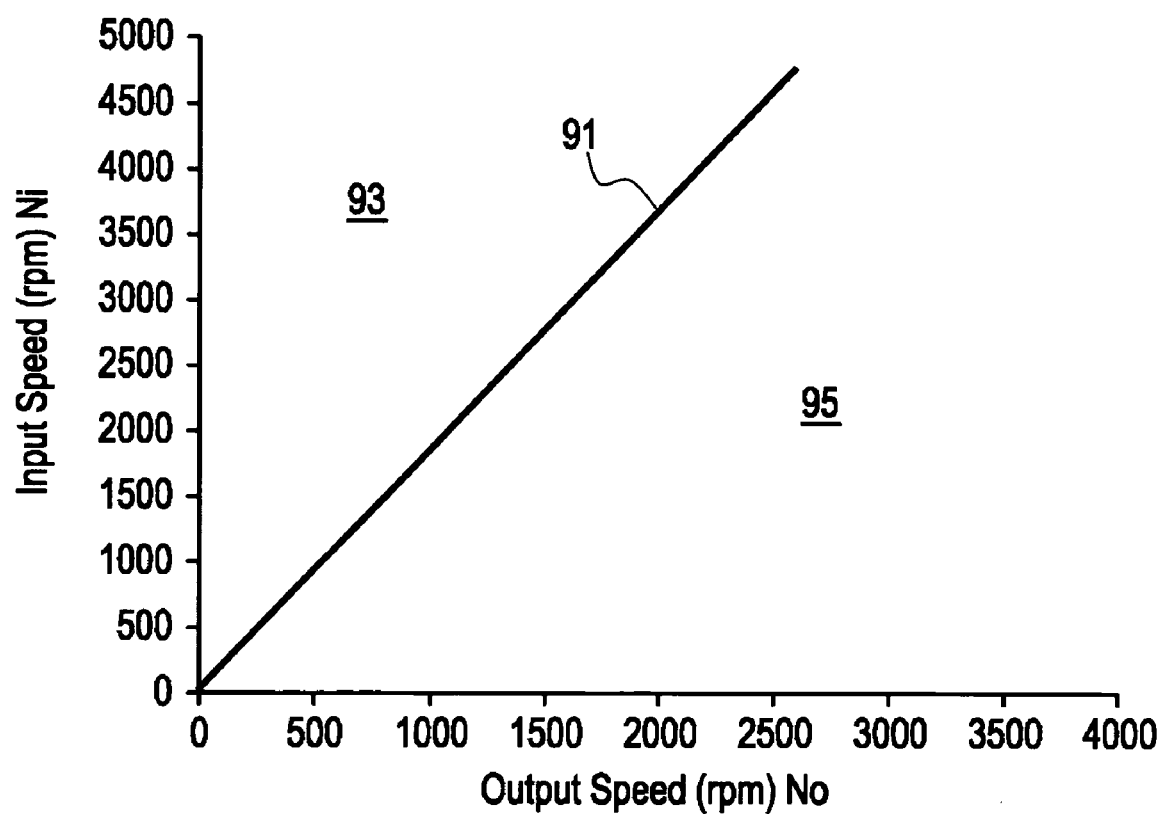
FIG. 3 is a graphical representation of various regions of operation with respect to input and output speeds of the exemplary EVT disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be effected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited. While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g. mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g. mass, size, cost, inertial capabilities, etc.) to the high speeds of region 93. Region 93, wherein MODE 1 operation is generally preferred, may be considered a low speed region whereas region 95, wherein MODE 2 operation is generally preferred, may be considered a high speed region. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

Within MODE 1 or the first range, a general objective of the control system is to maintain C1 engagement for lower range operation and to control input speed to optimize performance parameters of the system. As such, C1 is commanded to maximum pressure to maintain the clutch fully engaged. C2 on the other hand is commanded to minimum pressure to maintain the clutch fully disengaged. Within MODE 2 or second range, a general objective of the control system is to maintain C2 engagement for lower range operation and to control input speed to optimize performance parameters of the system. As such, C2 is commanded to maximum pressure to maintain the clutch fully engaged. C1 on the other hand is commanded to minimum pressure to maintain the clutch fully disengaged. A preferred synchronous shift control is disclosed in co-pending and commonly assigned U.S. patent application Ser. No. 10/686,510, incorporated herein by reference, which describes shifts from one mode to another occur synchronously—that is to say through a duration wherein the slip speed across both C1 and C2 is substantially zero with both C1 and C2 simultaneously applied and carrying torque—which effects direct mechanical coupling of the input to the output. Slip across both C1 and C2 may be simultaneously zero when both clutches are applied and carrying torque such as is the case when the transmission operates in a fixed-ratio mode in conjunction with or independent from a mode shift. Fixed-ratio mode is characterized wherein the input and output are mechanically coupled through the transmission at a fixed ratio, GR, whereby Ni is equivalent to the ratioed output speed, i.e. Ni=No*GR. This fixed ratio, GR, is also the effective gear ratio at any time the slip speed across both clutches is zero, including such times when slip across one or more clutches is controlled to zero by motor torque control. An exemplary speed control effectively utilized to control clutch slip through motor control is disclosed in co-pending and commonly assigned U.S. patent application Ser. No. 10/686,511 (now U.S. Pat. No. 7,219,000), incorporated herein by reference. The transmission is said to be synchronous when slip speed across both clutches is zero. The transmission is said to be operating in a fixed-ratio mode when operating synchronously with both clutches applied.

Figure 4:
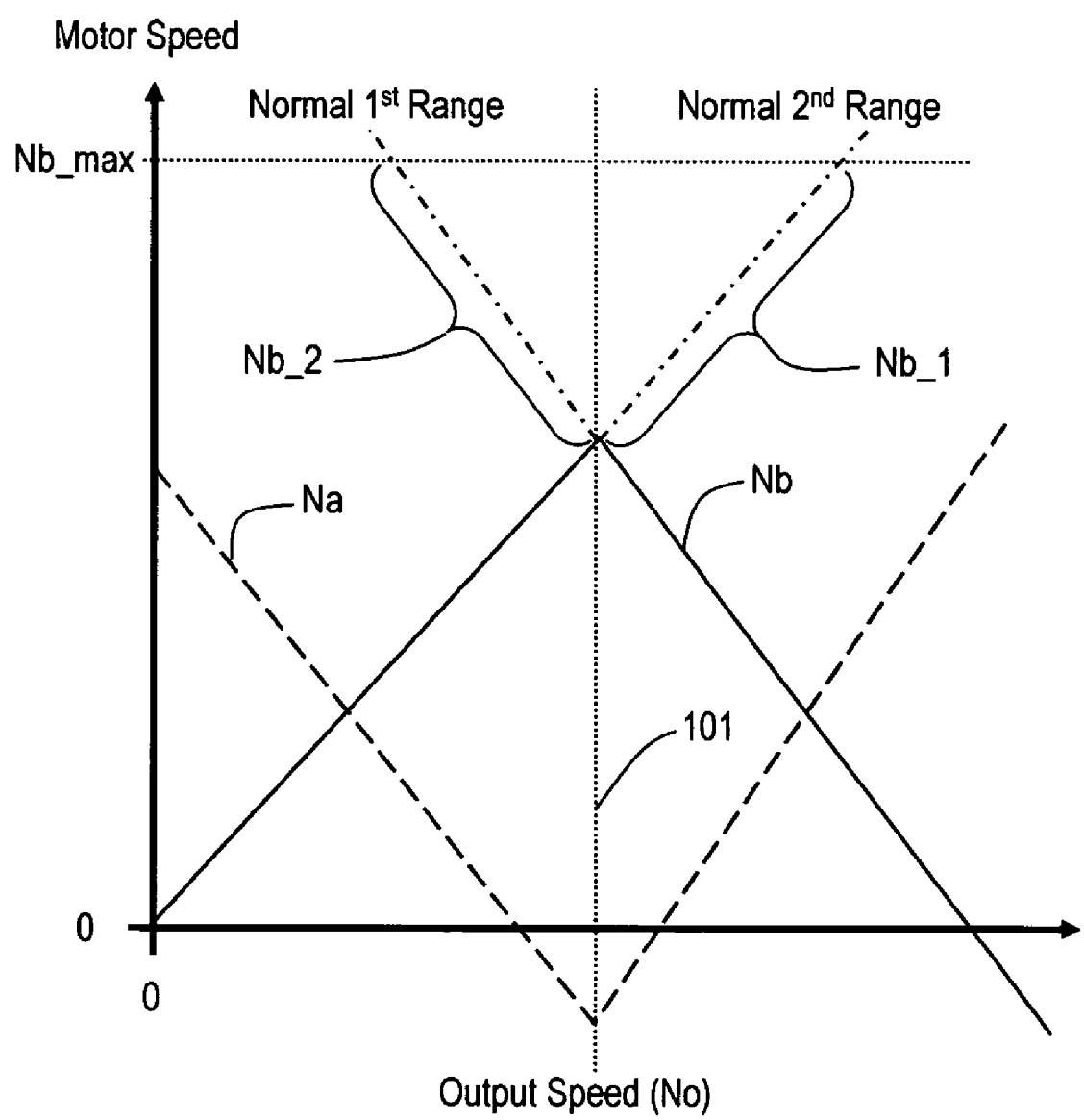
FIG. 4 is a graphical representation of characteristic motor speeds for the exemplary EVT shown in FIG. 1 illustrating normal speed ratio operation and speed ratio violation operation.

With reference now to FIG. 4 the effects of both normal ratio conditions and ratio violation conditions on motor A and motor B are illustrated. Motor output speed relationships are represented at an assumed fixed input speed. When the EVT is in first range, motor B speed, Nb, will continue to increase with increasing output speed, No, while motor A speed, Na, will continue to decrease. When in second range, motor B speed will continue to increase with decreasing output speed while motor A speed will continue to decrease. Normally, the EVT shifts between ranges synchronously, meaning both C1 and C2 clutches have zero slip. Such a zero slip condition substantially corresponds to the input and output speed relationship along line 91 of FIG. 3 and normal shift point line 101 in FIG. 4. After a shift, motor B speed, Nb, will start to decrease and motor A speed, Na, will start to increase, regardless of whether the shift is an upshift or downshift. It is noted that motor A speed actually crosses through zero and changes direction, i.e. goes negative, close to the normal shift point line 101. As used herein for motor A speeds, Na, decreasing motor speed includes increasingly larger negative speeds and increasing motor speed includes increasingly smaller negative speeds. If a shift does not occur due, for example, to an extreme driving condition, the EVT is subjected to a condition called gear ratio violation whereby the mode remains unchanged but the input/output speed relationship is within the range of preference for the other mode and motor A speeds continue to increase, e.g. Nb_1 and Nb_2. When stuck in MODE 1, the EVT system limits the maximum output speed to prevent motor B overspeed (Nb_1>Nb_max). When stuck in MODE 2, the system will limit input speed to avoid motor B overspeed (Nb_2>Nb_max). However, such ratio violations are generally undesirable and it is an objective of the present invention to address such operation by providing a shift to the appropriate range in accordance with the shift through neutral control as later described below in conjunction with FIGS. 7, 8, 11 and 12.

Figure 5:
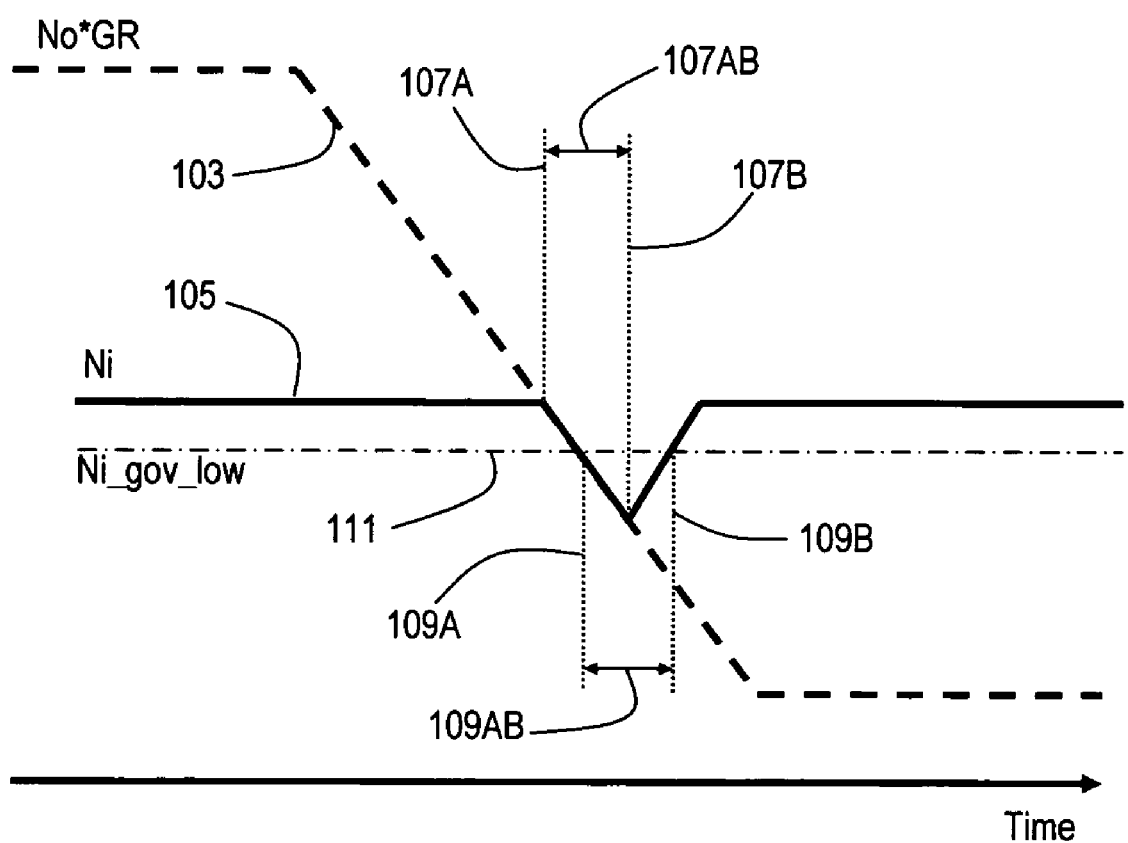
FIG. 5 is a graphical representation of a synchronous downshift during rapid vehicle deceleration resulting in undesirable engine lugging.

Continuing with reference to FIG. 5, the undesirable engine lugging effects of a synchronous downshift from MODE 2 to MODE 1 during rapid vehicle deceleration are illustrated. Here, the ratioed output speed, No*GR, is illustrated as broken line 103 and input speed, Ni, is illustrated as solid line 105. Input speed is preferably controlled in accordance with the method disclosed in co-pending and commonly assigned U.S. patent application Ser. No. 10/686,511 (now U.S. Pat. No. 7,219,000). It is noted that with the direct coupled arrangement of the engine and EVT complement previously described that the engine speed and the input speed are equivalent and that reference to one herein may be read to refer to the other likewise. Dashed line 111 represents a governed low engine speed. Vehicle deceleration is represented by the rapid negative slope of the ratioed output speed line 103 since it essentially corresponds to a scaled measure of output speed. As the ratioed output speed converges upon the input speed, Ni 105, a shift is initiated to shift from MODE 2 to MODE 1 in accordance with the synchronous shift control disclosed in co-pending and commonly assigned U.S. patent application Ser. No. 10/686,510. Therefore, synchronous speeds are reached, clutches C1 and C2 are fully applied and fixed-ratio mode 107AB is invoked at a point substantially corresponding to line 107A. The fixed-ratio mode results in the input speed Ni (engine speed) being pulled down by the mechanical coupling of the output to the input. Such an aggressive deceleration as represented by the ratioed output speed may result in the input speed being pulled down below the governed low engine speed 111 before the shift progresses sufficiently to exit from fixed-ratio mode at line 107B into mode 1 whereat the mechanical coupling is no longer in effect. The point whereat the input speed is pulled below the governed low engine speed 111 substantially corresponding to line 109A marks the beginning of an engine lugging condition 109AB. A less aggressive deceleration would have a correspondingly shallower slope on the ratioed output speed line 103 and would not result in pulling the input speed down to the point of lugging the engine before the shift progresses sufficiently to exit from fixed-ratio mode at line 107B into mode 1 whereat the mechanical coupling is no longer in effect. In the present example, however, the engine lugging condition occurs substantially at line 109A prior to the fixed-ratio mode exit at line 107B. Subsequent to line 107B, the input speed recovers at least to the governed low engine speed 111 at line 109B and up to a higher controlled input speed. At line 109B the engine lugging condition is over. However, such engine lugging conditions are generally undesirable and it is an objective of the present invention to address such operation by providing a shift to the appropriate range in accordance with the shift through neutral control as later described below in conjunction with FIGS. 9, 11 and 13.

Continuing with reference to FIG. 6, the undesirable engine overspeed effects, of a synchronous upshift from MODE 1 to MODE 2 during rapid vehicle acceleration are illustrated. Here, the ratioed output speed, No*GR, is again illustrated as broken line 103 and input speed, Ni, is again illustrated as solid line 105. Input speed is preferably controlled in accordance with the method disclosed in co-pending and commonly assigned U.S. patent application Ser. No. 10/686,511 (now U.S. Pat. No. 7,219,000). Dashed line 111 represents a governed high engine speed. Vehicle acceleration is represented by the rapid positive slope of the ratioed output speed line 103 since it essentially corresponds to a scaled measure of output speed. As the ratioed output speed converges upon the input speed, Ni 105, a shift is initiated to shift from MODE 1 to MODE 1 in accordance with life synchronous shift control disclosed in co-pending and commonly assigned U.S. patent application Ser. No. 10/686,510. Therefore, synchronous speeds are reached, clutches C1 and C2 are fully applied and fixed-ratio mode 107AB is invoked at a point substantially corresponding to line 107A. The fixed-ratio mode results in the input speed Ni (engine speed) being pulled up by the mechanical coupling of the output to the input. Such an aggressive acceleration as represented by the ratioed output speed may result in the input speed being pulled above the governed high engine speed 111' before the shift progresses sufficiently to exit from fixed-ratio mode at line 107B into mode 2 whereat the mechanical coupling is no longer in effect. The point whereat the input speed is pulled above the governed high engine speed 111' substantially corresponding to line 109A marks the beginning of an engine overspeed condition 109AB. A less aggressive acceleration would have a correspondingly shallower slope on the ratioed output speed line 103 and would not result in pulling the input speed up to the point of engine overspeed before the shift progresses sufficiently to exit from fixed-ratio mode at line 107B into mode 2 whereat the mechanical coupling is no longer in effect. In the present example, however, the engine overspeed condition occurs substantially at line 109A prior to the fixed-ratio mode exit at line 107B. Subsequent to line 107B, the input speed recovers at least to the governed low engine speed 111' at line 109B and down to a lower controlled input speed. At line 109B the engine overspeed condition is over. However, such engine overspeed conditions are generally undesirable and it is an objective of the present invention to address such operation by providing a shift to the appropriate range in accordance with the shift through neutral control as later described below in conjunction with FIGS. 10, 11 and 13.

Figure 11:
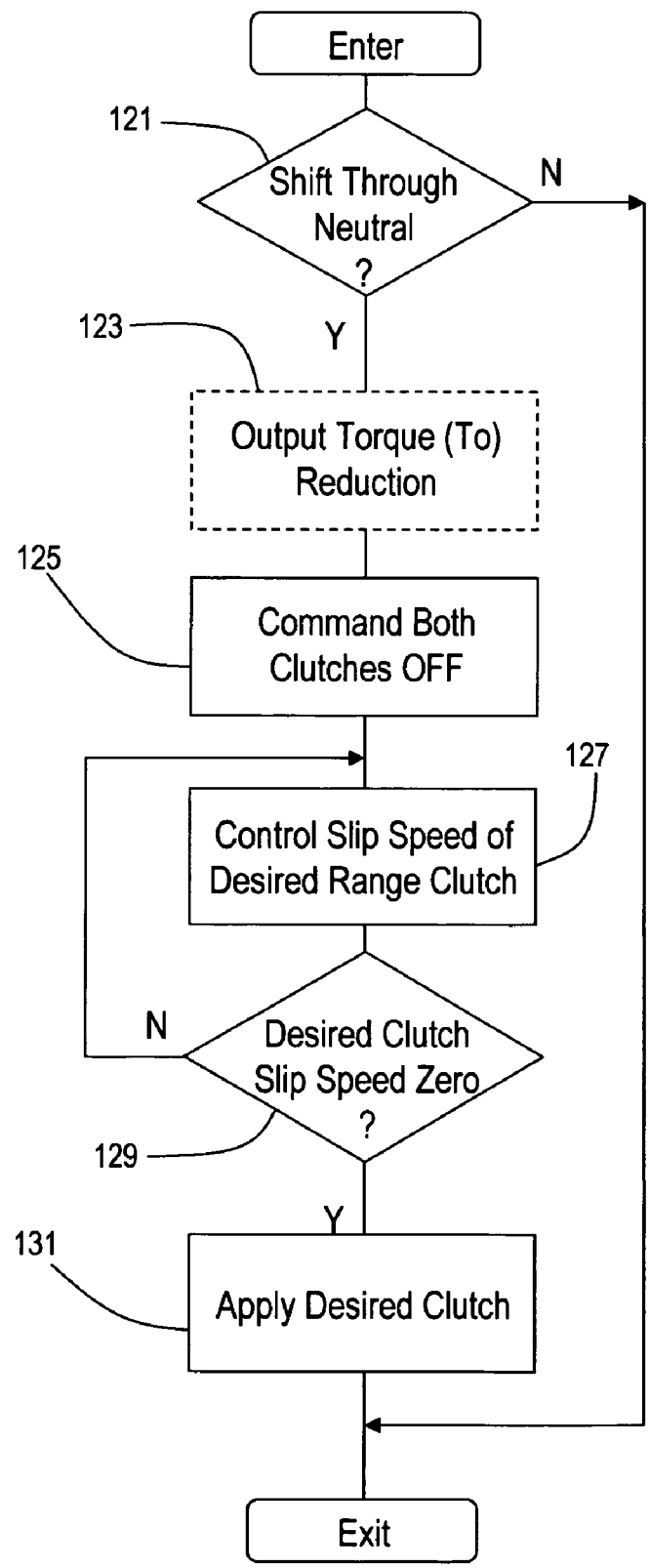
FIG. 11 is a high level flow chart illustrating certain preferred steps used in the various shift through neutral controls of the present invention.

Turning now to FIG. 11, a flow chart is illustrated which is generally applicable to addressing the various undesirable ratio violations, engine lugging and overspeed conditions described above. At step 121 a decision is made whether to enter the routine based upon predefined entry conditions indicative of the desireability of executing a shift through neutral shift (STN shift). The various entry conditions are discussed and described for ratio violations and acceleration/deceleration violations in conjunction with the flow charts of FIGS. 12 and 13, respectively. If a shift through neutral is not desired, then the routine merely exits without further action taken with regard to a STN shift.

Assuming that a STN shift is desired as determined at step 121, then step 123 is next encountered. Step 123 is applicable, however, only with respect to ratio violations and is further described in this regard in conjunction with FIG. 12 only. Generally, step 123 provides for a reduction in commanded output torque, To_des, in preparation for the release of the currently applied clutch in order to reduce objectionable driveline disturbances from torque incontinuities. With an acceleration or deceleration violation, the event occurs with such rapidity that ramping torque to zero is not practical. Additionally, the more transient nature of acceleration and deceleration violations makes torque disturbances substantially less noticeable.

Next, and subsequent to the torque reduction of step 123 in the case of a ratio violation, step 125 establishes both clutches OFF so that neither has any torque carrying capacity and the output is effectively decoupled from the EVT. This is also referred to as the neutral mode. Subsequent to the neutral mode having been established, step 127 is next encountered. Step 127 controls the slip speed of the clutch to be applied corresponding to the desired range to substantially zero speed in preparation for application of the clutch. The clutch slip speed for the clutch to be applied corresponding to the desired range is checked at step 129. This monitoring continues until the clutch slip speed is substantially zero whereafter the control passes to step 131. At step 131 the clutch corresponding to the desired range is applied to complete the STN shift.

Figure 12:
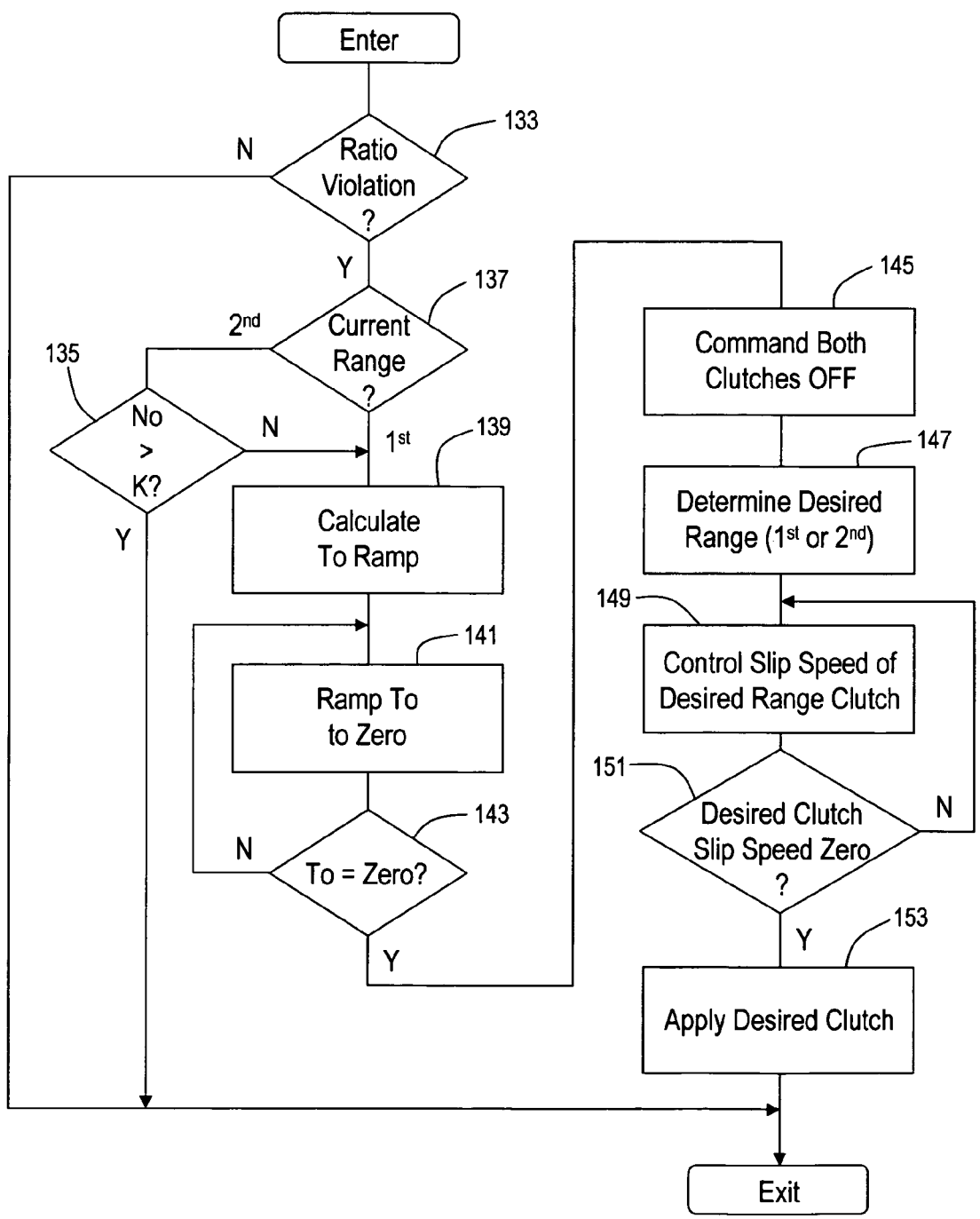
FIG. 12 is a more detailed flow chart illustrating certain preferred steps used in an upshift and downshift shift through neutral control precipitated by a ratio violation conditions; and, FIG. 13 is a more detailed flow chart illustrating certain preferred steps used in an upshift and downshift shift through neutral control precipitated by an acceleration or deceleration conditions.

Reference is now made to the detailed flow chart of FIG. 12 and corresponding FIGS. 7 and 8 for STN upshifts and downshifts corresponding to first and second ratio violations respectively. Step 133 first determines whether a ratio violation has occurred. The preferred test for determining a speed ratio violation, whether in first or second range, is to compare the ratioed output speed to the input speed. In the case of a first range ratio violation and with further reference to FIG. 7, if No*GR exceeds Ni by a predetermined offset then a first range ratio violation is assumed. Normally, No*GR is expected to be less than Ni in the first range. In the case of a second range ratio violation and with further reference to FIG. 8, if No*GR is less than Ni by a predetermined offset then a second range ratio violation is assumed. Normally, No*GR is expected to be greater than Ni in the second range. Both of these situations are referenced in charts A of the respective FIGS. 7 and 8 at time A. If no violation has occurred then the routine immediately exits. If however a ratio violation has occurred then control passes to step 137.

If the current range is second, step 137, then an additional test at step 135 is preferably performed on output speed, No, at step 135. An output speed that exceeds a predetermined calibration threshold, K, bypasses further steps and the routine exits. At higher than calibration output speeds, it is more likely that the EVT will recover from a ratio violation by moving into the preferred input speed/output speed relationship range for second mode. For example, a ratio violation wherein the EVT remains in MODE 2 most likely occurs during deceleration and approach of zero output speed. The closer to zero speed, the more likely the vehicle will stop and the more appropriate a shift to MODE 1. The output torque interruption occasioned by a STN shift would be less objectionable when occurring at a stop. An exemplary calibration of K may be set at about 5 mph which would allow for significant vehicle deceleration and subsequent acceleration from low speeds while remaining in MODE 2, thus avoiding an otherwise undesirable output torque interruption occasioned by a STN shift. However, at vehicle speeds below 5 mph, it is more likely that the vehicle will come to a stop and thus allowing the STN is not as significant of an event. On the other hand, when the current range is first during a ratio violation, it is most likely the vehicle is accelerating. The sooner a STN shift is accomplished, i.e. the earlier in vehicle speed as the vehicle accelerates, the shorter the time required to accomplish the shift and hence the less noticeable and objectionable the STN shift will be.

FIG. 8 illustrates the ratioed output speed falling below the ratioed calibration threshold, K, at time B. Where the current range is second or the output speed test is negative, step 139 calculates a torque reduction rate or torque ramp. Preferably, the ramp is to zero and is calculated in accordance with the following relationship:

$$\text{Torque\_Ramp} = \text{To\_des}/(\text{STN\_prep} - \text{TR\_delay} - \text{STN\_delay})$$

Where To_des is;

STN_prep is a time period before STN shift is begun;

TR_delay is the time period before torque ramping will begin; and

STN_delay is the time period between the end of torque ramping and the beginning of the STN shift.

Steps 141 and 143 next ramp the output torque to zero beginning with the lesser of the present commanded output torque, To_des, or the starting torque used to calculate Torque_Ramp. In FIGS. 7 and 8, torque ramping is shown beginning at times B and C, respectively. When the torque has been ramped to zero as shown in FIGS. 7 and 8 at times C and D, respectively, step 145 next begins the STN shift after a delay, STN_delay. The time delay is illustrated in FIGS. 7 and 8 at times C-D and D-E, respectively. At step 145 both clutches are commanded off to enter neutral mode. In the case of a first range violation, clutch C1 is commanded OFF as illustrated in FIG. 7 at time D. In the case of a second range violation, clutch C2 is commanded OFF as illustrated in FIG. 8 at time E. Next at step 147 the desired range is determined after which steps 149 and 151 work to control the slip speed of the clutch associated with the desired range to zero (Nc1 or Nc2). Preferably, the slip speed of the clutches in neutral mode is controlled through motor control in accordance with the method disclosed in co-pending and commonly assigned U.S. patent application Ser. No. 10/686, 511 (now U.S. Pat. No. 7,219,000). Once substantially zero slip speed has been achieved, step 153 applies the corresponding clutch to establish torque capacity and complete the STN shift. Respective clutch applications are shown in FIGS. 7 and 8 at times E and F, respectively. After completion of the STN shift, such as may be indicated by the respective applied clutch's pressure switch, output torque begins recovering to a desired setpoint in accordance with normal EVT control. This is shown in FIGS. 7 and 8 at times F and G, respectively.

Figure 13:
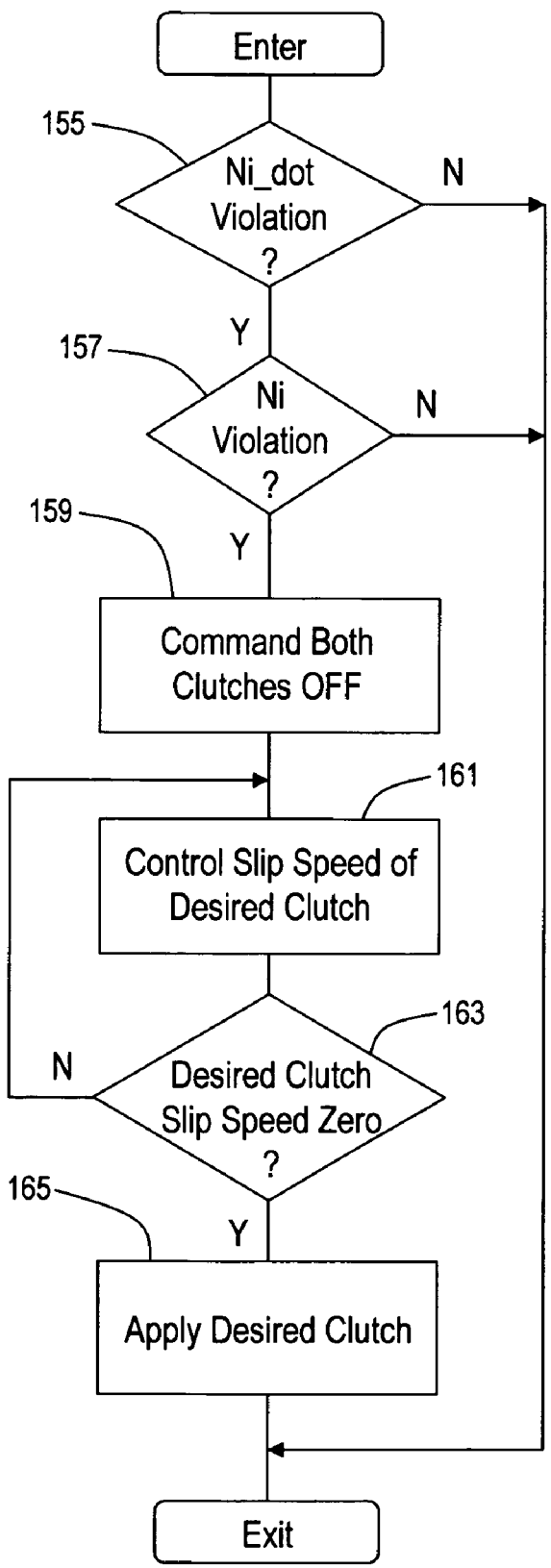

Reference is now made to the detailed flow chart of FIG. 13 and corresponding FIGS. 9 and 10 for STN downshifts and upshifts corresponding to excessive decelerations and accelerations, respectively. Steps 155 and 156 first determine whether an acceleration or deceleration violation has occurred. Step 155 checks the rate of acceleration or deceleration against respective calibration thresholds. If the output speed is increasing or decreasing at an unacceptably high rate likely to result in engine overspeed or lugging, respectively, the step 155 is answered affirmatively and processing passes to the test of step 157. Otherwise, the routine is immediately exited. With reference to FIGS. 9 and 10, time A corresponds to such excessive deceleration or acceleration condition, respectively.

At step 157, a determination is made whether the input speed (engine speed) violates a calibrated threshold speed. In the case of a deceleration, the test is whether input speed is below a predetermined input speed threshold, Ni_min. In the case of an acceleration, the test is whether input speed is above a predetermined input speed threshold, Ni_max. An affirmative result at step 157 confirms that the conditions for an acceleration or deceleration induced STN shift are present and processing passed to step 159. Otherwise, the routine is immediately exited. FIGS. 9 and 10 illustrate the respective input speed threshold violation for deceleration and acceleration, respectively, at time B. Alternatively, a projected input speed violation for a deceleration may be used in step 157 in accordance with the following relationship:

$$\text{Ni} + \text{Decel\_Rate} * \text{Time} < \text{Ni\_min}$$

where Decel_Rate is the calculated output speed deceleration rate; and,

Time is the period within which a violation is determined.

Similarly, a projected input speed violation for an acceleration may be used in step 157 in accordance with the following relationship:

$$\text{Ni} + \text{Accel\_Rate} * \text{Time} > \text{Ni\_min}$$

where Accel_Rate is the calculated output speed acceleration rate; and,

Time is the period within which a violation is determined.

At step 159 both clutches are commanded OFF to enter neutral mode. In the case of an acceleration violation, clutch C1 is commanded OFF as illustrated in FIG. 10. In the case of a deceleration violation, clutch C2 is commanded OFF as illustrated in FIG. 9. Next steps 161 and 163 work to control the slip speed of the clutch associated with the desired range to zero (Nc1 or Nc2). Preferably, the slip speed of the clutches in neutral mode is controlled through motor control in accordance with the method disclosed in co-pending and commonly assigned U.S. patent application Ser. No. 10/686, 511 (now U.S. Pat. No. 7,219,000). Once substantially zero slip speed has been achieved, step 165 applies the corresponding clutch to establish torque capacity and complete the STN shift. Respective clutch applications are shown in FIGS. 9 and 10 at times C. After completion of the STN shift, such as may be indicated by the respective applied clutch's pressure switch, normal EVT control is returned.

With the various implementations having thus been described, it can be appreciated that the STN shift control successfully addresses ratio violation, engine lugging and engine overspeed conditions occasioned by extreme driving conditions.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method for controlling a mode to mode shift in a multi-mode, electro-mechanical transmission including an input member and an output member, first and second torque transfer devices, at least one motor, first mode operation characterized by simultaneous first torque transfer device applied and second torque transfer device released wherein the transmission input member is mechanically coupled to the transmission output member through a continuously variable ratio, second mode operation characterized by simultaneous first torque transfer device released and second torque transfer device applied wherein the transmission input member is mechanically coupled to the transmission output member through a continuously variable ratio, neutral operation characterized by simultaneous first and second torque transfer devices released wherein the transmission output member is mechanically decoupled from the transmission, and fixed-ratio operation characterized by simultaneous first and second torque transfer devices applied wherein the transmission input member is mechanically coupled to the transmission output member through a fixed ratio, comprising:

while in one of the first and second modes, releasing the one of the first and second torque transfer devices that is applied to establish neutral mode operation;

controlling slip speed across one of the first and second torque transfer devices to substantially zero; and, applying the one of the first and second torque transfer devices across which slip is being controlled when the slip thereacross is substantially zero.

2. The method for controlling a shift as claimed in claim 1 wherein controlling slip speed across the one of the first and second torque transfer devices is accomplished by adjusting motor torque.

3. The method for controlling a shift as claimed in claim 2 wherein controlling slip speed terminates when the one of the first and second torque transfer devices across which slip is being controlled is fully applied.

4. The method for controlling a shift as claimed in claim 1 further comprising:

establishing a substantially zero torque at the output member immediately in advance of releasing the one of the first and second torque transfer devices.

5. The method for controlling a shift as claimed in claim 4 further comprising:

establishing a substantially non-zero torque at the output member immediately subsequent to the application of the one of the first and second torque transfer devices.

6. The method for controlling a shift as claimed in claim 1 wherein the shift is initiated in response to a ratio violation.

7. The method for controlling a shift as claimed in claim 1 wherein the shift is initiated in response to a rate of change of output member speed in excess of a predetermined amount.

8. Method for controlling a mode to mode shift in a multi-mode, electro-mechanical transmission including an input member and an output member, first and second torque transfer devices, at least one motor, first mode operation characterized by simultaneous first torque transfer device applied and second torque transfer device released wherein the transmission input member is mechanically coupled to the transmission output member through a continuously variable ratio, second mode operation characterized by simultaneous first torque transfer device released and second torque transfer device applied wherein the transmission input member is mechanically coupled to the transmission output member through a continuously variable ratio, neutral operation characterized by simultaneous first and second torque transfer devices released wherein the transmission output member is mechanically decoupled from the transmission, fixed-ratio operation characterized by simultaneous first and second torque transfer devices applied wherein the transmission input member is mechanically coupled to the transmission output member through a fixed ratio, and a preferred operating region for first mode operation on one side of the fixed ratio and a preferred operating region for the second mode of operation on the other side of the fixed ratio, comprising:

when one of the first and second modes of operation is active within the preferred operating region for the other of the first and second modes of operation, executing a shift through the neutral operation comprising;

reducing output member torque to substantially zero, releasing the one of the first and second torque transfer devices that is applied, determining which of the first and second modes is desired, controlling to substantially zero the slip speed across the one of the first and second torque transfer devices which when applied establishes the desired one of the first and second modes, applying the one of the first and second torque transfer devices that will establish the desired one of the first and second modes, and increasing output member torque to non-zero.

9. The method as claimed in claim 8 wherein reducing output torque to substantially zero includes ramping output torque at a predetermined rate.

10. The method for controlling a shift as claimed in claim 8 wherein controlling slip speed is accomplished by adjusting motor torque.

11. Method for controlling a mode to mode shift in a multi-mode, electro-mechanical transmission including an input member and an output member, first and second torque transfer devices, at least one motor, first mode operation characterized by simultaneous first torque transfer device applied and second torque transfer device released wherein the transmission input member is mechanically coupled to the transmission output member through a continuously variable ratio, second mode operation characterized by simultaneous first torque transfer device released and second torque transfer device applied wherein the transmission input member is mechanically coupled to the transmission output member through a continuously variable ratio, neutral operation characterized by simultaneous first and second torque transfer devices released wherein the transmission output member is mechanically decoupled from the transmission, fixed-ratio operation characterized by simultaneous first and second torque transfer devices applied wherein the transmission input member is mechanically coupled to the transmission output member through a fixed ratio, and a preferred operating region for first mode operation on one side of the fixed ratio and a preferred operating region for the second mode of operation on the other side of the fixed ratio, comprising:

when the first mode of operation is active within the preferred operating region therefor and the output member experiences a rate of change of speed in excess of a preset threshold, executing a shift through the neutral operation comprising;

releasing the first torque transfer device, controlling slip speed across the second torque transfer devices to substantially zero, and applying the second torque transfer device when the slip speed of the torque transfer device is substantially zero.

12. The method for controlling a shift as claimed in claim 11 wherein controlling slip speed across the second torque transfer device is accomplished by adjusting motor torque.

* * * * *